United States Patent
Trantham et al.

(10) Patent No.: US 7,621,461 B2
(45) Date of Patent: Nov. 24, 2009

(54) SYSTEM AND METHOD FOR REGULATING HEAT TRANSFER ON A FLUID BY REGULATING THE FLOW OF THE FLUID

(75) Inventors: John M. Trantham, Hurst, TX (US); Leif Marstorp, Ljung (SE)

(73) Assignee: Flow Design, Inc., Dallas, TX (US)

( * ) Notice: Subject to any disclaimer, the term of this patent is extended or adjusted under 35 U.S.C. 154(b) by 205 days.

(21) Appl. No.: 11/465,650

(22) Filed: Aug. 18, 2006

(65) Prior Publication Data

US 2008/0041971 A1 Feb. 21, 2008

(51) Int. Cl.
*G05D 23/02* (2006.01)
*G05D 23/12* (2006.01)

(52) U.S. Cl. ............... 236/93 A; 236/99 R; 236/99 J; 236/100

(58) Field of Classification Search ............... 236/93 A, 236/99 R, 99 J, 100
See application file for complete search history.

(56) References Cited

U.S. PATENT DOCUMENTS 5,802,862 A * 9/1998 Eiermann .................... 62/173
5,813,601 A * 9/1998 Priest et al. ............... 236/93 A
6,688,319 B2 * 2/2004 Trantham et al. ............. 137/2
2002/0047102 A1 * 4/2002 Hankin et al. ............... 251/285

* cited by examiner

*Primary Examiner*—Marc E Norman
(74) *Attorney, Agent, or Firm*—Baker Botts L.L.P.

(57) ABSTRACT

According to one embodiment of the invention, a system for regulating a temperature of a fluid through a conduit comprises a conduit, a moveable obstruction, an actuator, and a pressure generator. The conduit has an inlet, an outlet, and an opening between the inlet and the outlet. The inlet is operable to receive fluid into the conduit and the outlet is operable to dispense of fluid out of the conduit. The moveable obstruction is operable to at least partially cover the opening and thereby resist flow of fluid through the opening. The actuator has a chamber with a heat sensitive substance. The heat sensitive substance is operable to change a characteristic upon receipt of thermal energy from fluid traveling through the conduit. The actuator is additionally operable to move the obstruction upon the change in characteristic of the heat sensitive substance. The pressure generator is operable to apply pressure to the chamber to change a property of the heat sensitive substance. The change in property of the heat sensitive substance changes the movement of the obstruction by the actuator.

27 Claims, 3 Drawing Sheets

SYSTEM AND METHOD FOR REGULATING HEAT TRANSFER ON A FLUID BY REGULATING THE FLOW OF THE FLUID

TECHNICAL FIELD OF THE INVENTION

This invention relates generally to the field of heat transfer and, more particularly, to a system and method for regulating heat transfer on a fluid by regulating the flow of the fluid.

BACKGROUND OF THE INVENTION

A variety of different heat transfer systems use water or other fluids to transfer heat or thermal energy between one or more production units and one or more loads. Such systems are often referred to as hydronic systems.

SUMMARY OF THE INVENTION

According to one embodiment of the invention, a system for regulating a temperature of a fluid through a conduit comprises a conduit, a moveable obstruction, an actuator, and a pressure generator. The conduit has an inlet, an outlet, and an opening between the inlet and the outlet. The inlet is operable to receive fluid into the conduit and the outlet is operable to dispense of fluid out of the conduit. The moveable obstruction is operable to at least partially cover the opening and thereby resist flow of fluid through the opening. The actuator has a chamber with a heat sensitive substance. The heat sensitive substance is operable to change a characteristic upon receipt of thermal energy from fluid traveling through the conduit. The actuator is additionally operable to move the obstruction upon the change in characteristic of the heat sensitive substance. The pressure generator is operable to apply pressure to the chamber to change a property of the heat sensitive substance. The change in property of the heat sensitive substance changes the movement of the obstruction by the actuator.

Certain embodiments of the invention may provide numerous technical advantages. For example, in particular embodiments, applying pressure to a heat sensitive substance may cause the properties of the heat sensitive substance to change, enabling the heat sensitive substance to be operable at a wide range of temperatures. Therefore, the system can handle a temperature setting without the potential stroke at the valve being excessive. Other technical advantages of other embodiments may include a maximum flow regulator operable to limit the maximum flow rate of the fluid and rendering the system incapable of using all of the fluid. Thus, a plurality of embodiments of the invention may be used simultaneously without hindering the ability of any of the embodiments to receive an appropriate supply of the fluid, and allowing each embodiment to successfully regulate the temperature of the fluid to the temperature selected.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of example embodiments of the present invention and its advantages, reference is now made to the following description, taken in conjunction with the accompanying drawings, in which.

DETAILED DESCRIPTION OF THE INVENTION

It should be understood at the outset that although example embodiments of the present invention are illustrated below, the present invention may be implemented using any number of techniques, whether currently known or in existence. The present invention should in no way be limited to the example embodiments, drawings, and techniques illustrated below, including the embodiments and implementation illustrated and described herein. Additionally, the drawings are not necessarily drawn to scale.

A variety of different heat transfer systems use water or other fluids to transfer heat or thermal energy between one or more production units and one or more loads. Such systems are often referred to as hydronic systems.

These systems often utilize multiple heat exchangers connected in parallel. The flow of water through each heat exchanger is typically controlled with an electric or pneumatic control valve. In these systems, balancing valves are sometimes installed to ensure that each terminal receives an appropriate amount of water. These balancing valves are beneficial because there is always some pressure loss between the various stations along the main piping. In such situations, the stations closest to the pump have the least loss of pressure through their piping. Accordingly, stations closer to the pump tend to receive more water than stations further from the pump.

One approach used in mitigating these types of problems is to include adjustable restrictions and measuring means at each of the load heat exchangers (also referred to as "terminals"). When the system is first started, a balancing contractor goes through the system making sure that the correct maximum flow is allowed at each terminal. This prevents the less favored circuits from being starved and ensures that the production equipment (boilers, chillers, etc. . . . ) is used to its fullest advantage when the system is under maximum load.

Another approach used in mitigating these types of problems is utilization of flow limiting devices at each of the terminals. The flow limiting devices perform the same function as manual balancing, but are able to react to changing conditions in the system.

Both of the approaches above only perform well when the terminal they are attached to is operating at its maximum load. As the load diminishes, either the control valve must take over, or the terminal will continue taking the prescribed maximum flow. Such behavior not only causes a waste of pumping energy, but also provides a poor temperature differential for the production equipment. Further, with equipment based on a vapor cycle, a low temperature differential reduces efficiency.

Accordingly, teachings of some embodiments of the invention recognize a configuration which can overcome such limitation by both limiting the maximum flow through a terminal and requiring an appropriate return water temperature. For example, in an embodiment which uses chilled water to cool the loads, the water would be forced to rise to at least a prescribed minimum temperature before exiting the terminal. Besides preventing wasteful over-circulation at part load, this embodiment may remove the need for a separate control valve in many instances. If the thermostat in the room changes the amount of air circulated over the coil, this embodiment would naturally change the flow of water in a coordinated fashion. When the air flow across the coil stops, the flow rate drops to a very low level, since the water is still required to undergo the same temperature change. This small quiescent circulation is beneficial in particular embodiments because it prevents re-evaporation of condensate and keeps the terminal ready to provide cooling as soon as the demand is restored. In systems without such a feature, it may be necessary to provide some sort of bypass means at the end of each main line so that water continues to circulate.

In particular embodiments, a valve may be set for a temperature by a user. In such an embodiment, a valve for a cooling application would be designed to close when the temperature was below the set point and open when the temperature was above the set point. Water enters the terminal at some temperature, and draws heat out of a load. In the process, the temperature of the water increases. The longer the water is in the terminal, the higher its temperature when it exits (up to the temperature of the load). Thus, when the valve is too cold, it closes slightly, which yields warmer water. When the valve is too warm, it opens slightly, yielding cooler water. In these embodiments, the process naturally regulates the return water temperature to a nearly constant value.

According to particular embodiments, the valve may incorporate a thermal actuator that communicates with water traveling therethrough. In these embodiments, the actuator moves some restricting element to change the flow rate of water. In the simplest case, the actuator would expand and push the restriction open, and some restoring force would close the valve when the actuator contracted.

Some thermal actuators based on simple expansion suffer from a limitation in their accuracy. Specifically, some thermal actuators expand linearly with temperature. Thus, if they are designed for a large stroke over a small temperature range, provisions must be made to absorb a far greater expansion when the temperature is outside the intended range. If the actuating material is not highly compressible, then even further expansion must be allowed. If the material is highly compressible, then the actuator must be large in order to overcome disturbance forces such as friction. This unhappy dilemma can be overcome by teachings of some embodiments of the invention, which recognize that some materials undergo a volume change when going from solid to liquid that is far higher than their ordinary coefficient of thermal expansion in either the solid or liquid state. In such embodiments, a strong actuator can be used over its entire stroke without fear that it will expand four times as much when the temperature leaves the actuating range. According to particular embodiments, the material used in this actuator for this purpose is from the family of chemicals called paraffins or alkanes. Chemicals in this family undergo a high expansion when they melt. These chemicals are sometimes referred to as wax, despite the technical inaccuracy of that name.

Teachings of particular embodiments of the invention additionally recognize that substances which undergo a large volume change associated with melting also have a melting point which varies with pressure. The pressure of the water surrounding the actuator is not enough to make a difference, but many variable restrictions experience a force due to the pressure drop across them. This force is transmitted to the actuator where it is seen as a much higher pressure. In particular embodiments, to avoid certain undesired pressures that may evolve, the restricting means may be designed to avoid pressure sensitivity or coupled with a pressure compensating mechanism. The pressure compensating mechanism creates another restriction which absorbs all differential pressure in excess of the intended level, thus holding the differential pressure across the control restriction to a nearly constant value. Besides relieving the actuator of the variable reaction forces, this causes the flow rate to be a function of only the opening of the control restriction. In particular embodiments, a two-axis adjuster may be utilized, like the Multiflow valve available from Flow Design, Inc., the assignee of the present application. In such embodiments, a maximum flow can be set which is not dependant on the differential pressure at the terminal, and the thermal valve will modulate also in a way that is not dependant on the differential pressure.

In particular embodiments, the pressure dependence of the phase change can allow an external force to change the set-point of the valve without the need to have a long-stroke actuator which is changed in location. In such embodiments, a fairly compact device can be used.

Teachings of particular embodiments recognize a device that can have two adjustments. In this embodiment, one adjustment sets the maximum flow rate and the other adjustment sets the return water temperature. In the preferred embodiment, both of these adjustments are provided. In particular embodiments, a rotary setting of a gate changes the maximum flow, and a screw compresses a spring to set the temperature. As the screw compresses the spring, the force acting against the thermal actuator increases. This, in turn, increases the melting point of the wax in the actuator, for example, through increased pressure. Thus, the actuation temperature increases. In particular embodiments, a pressure compensator keeps the pressure difference across a control restriction at a constant value. The maximum flow setting would control one dimension of this restriction, while the thermal actuator determined the other. Further details of such embodiments are described below.

Figure 1:
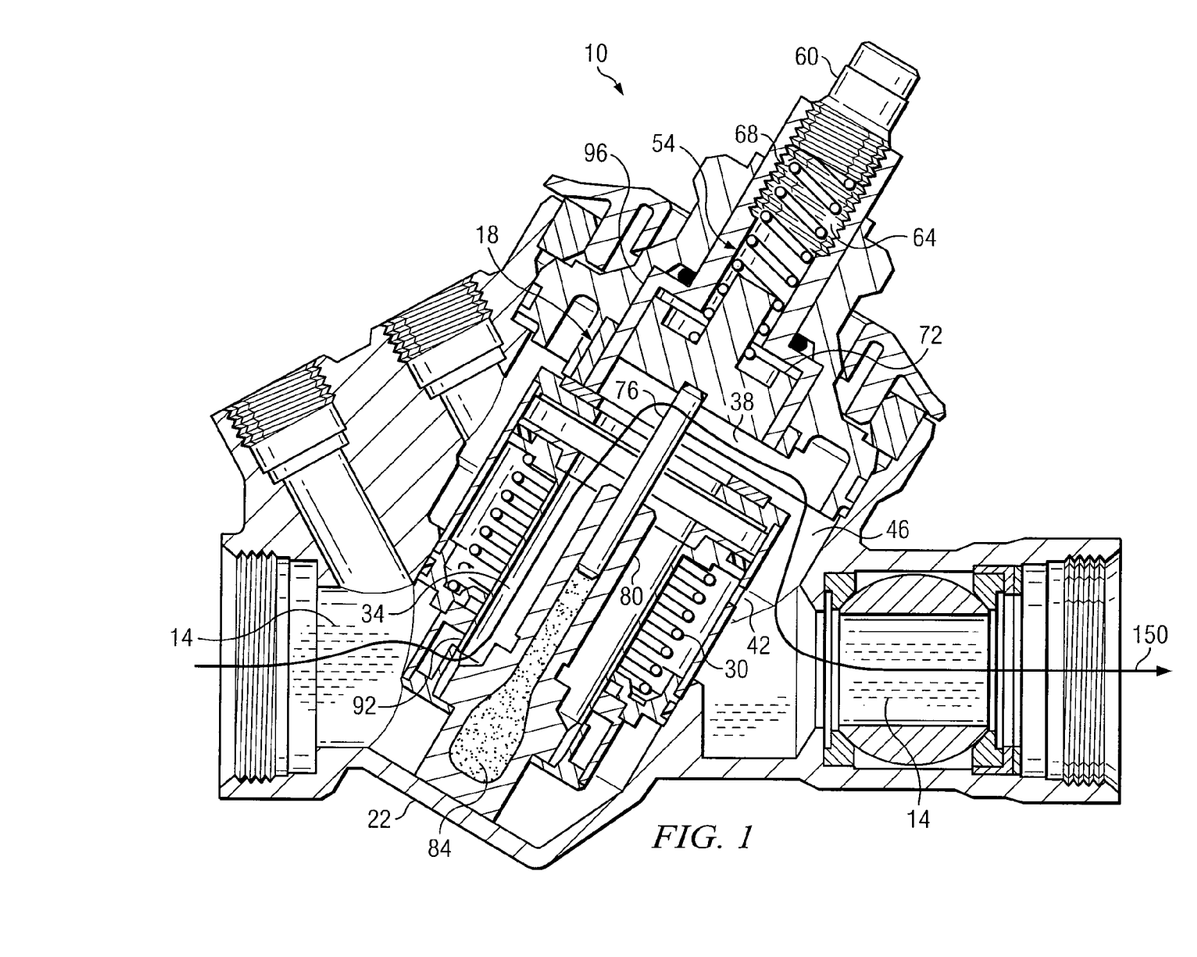
FIG. 1 is a sectional view of a system operable to regulate heat transfer on a fluid.

FIG. 1 is a sectional view of a system 10 operable to regulate heat transfer on a fluid according to an embodiment of the invention. Generally, system 10 is operable to regulate heat transfer on a fluid 14 by regulating the flow of fluid 14 through system 10. For example, by restricting the flow of fluid 14, system 10 forces fluid 14 to undergo heat transfer for a longer period of time. On the other hand, by increasing the flow of fluid 14, system 10 forces fluid 14 to undergo heat transfer for a shorter period of time. Therefore, in an embodiment where fluid 14 is being heated, restricting the flow of fluid 14 may cause the temperature of fluid 14 to increase while increasing the flow of fluid 14 may cause the temperature of fluid 14 to decrease. In a further embodiment, system 10 may be placed in the return line of a hydronic system.

In one particular embodiment, system 10 comprises a heat sensitive substance 84 operable to assist in regulating the heat transfer on fluid 14. Applying pressure to heat sensitive substance 84 causes the properties of heat sensitive substance 84 to change and enables heat sensitive substance 84 to be operable at a wide range of temperatures. Therefore, system 10 can handle a temperature setting without the potential stroke at the valve being excessive. System 10, in the illustrated embodiment, further comprises a maximum flow regulator 96 operable to limit the maximum flow rate of fluid 14. By using maximum flow regulator 96 to preset a maximum flow rate of fluid 14, system 10 is incapable of using all of fluid 14. Thus, a plurality of embodiments of system 10 may be used simultaneously without hindering the ability of any of the embodiments of system 10 to receive an appropriate supply of fluid 14, and allowing each embodiment to successfully regulate the temperature of fluid 14 to the temperature selected.

System 10 may be used to regulate heat transfer on any suitable fluid 14. Fluid 14 may include liquids, gases, and plasmas, and may have any suitable viscosity and temperature. In one embodiment, fluid 14 may comprise water. In the illustrated embodiment, fluid 14 comprises water at a temperature between fifty and sixty degrees Fahrenheit. In this particular embodiment, system 10 may be used to regulate heat transfer on water by regulating the flow of the water, allowing a near constant, desired water temperature to exit system 10.

According to the illustrated embodiment, system 10 comprises a conduit 22. Conduit 22 may be used to hold fluid 14 while system 10 regulates heat transfer on fluid 14. Conduit 22 may be of any suitable type and have any suitable geometry. For example, conduit 22 may comprise metal and may further comprise a plurality of sections. In the illustrated embodiment, conduit 22 comprises four sections: an inlet 34, a passage 38, a feedback 42, and an outlet 46. Inlet 34 may allow fluid 14 to enter conduit 22. Passage 38 may connect inlet 34 to outlet 46, allowing fluid 14 to flow from inlet 34 to outlet 46. Feedback 42 may allow fluid 14 in outlet 46 to communicate with a pressure compensator 30, allowing for the regulation of pressure throughout conduit 22. Outlet 46 may allow fluid 14 to exit conduit 22 after system 10 has regulated the heat transfer on fluid 14. In the illustrated embodiment, the flow of fluid 14 through conduit 22, beginning at inlet 34, passing through passage 38, and ending at outlet 46, may be envisioned flow arrow 150.

System 10 may also include a heat transfer system (not shown), pressure compensator 30, and a flow regulating system 18 coupled to conduit 22 as shown. The heat transfer system is operable to conduct heat transfer on fluid 14. Therefore, in one embodiment, when system 10 restricts the flow of fluid 14, fluid 14 undergoes heat transfer from heat transfer system (not shown) for a longer period of time, increasing the amount of heat transfer that occurs. Additionally, when system 10 increases the flow of fluid 14, fluid 14 undergoes heat transfer from heat transfer system 26 for a shorter period of time, decreasing the amount of heat transfer that occurs.

Heat transfer system 26 may comprise any suitable heat transfer system having any suitable size or shape. For example heat transfer system 26 may comprise a heater or a cooler. Heat transfer system 26 may also comprise other embodiments known by one of ordinary skill in the art. For purpose of illustration, heat transfer system 26 will be described as a cooling coil operable to conduct heat transfer on both fluid 14 and another fluid, such as air. As the cooling coil conducts heat transfer, heat from the air is transferred to fluid 14, causing the air to decrease temperature and fluid 14 to increase temperature. Therefore, restricting the flow of fluid 14 may increase the temperature of fluid 14 while increasing the flow of fluid 14 may decrease the temperature of fluid 14. In one particular embodiment, heat transfer system 26 is operable to conduct heat transfer on fluid 14 before fluid 14 enters conduit 22 through inlet 34.

Pressure compensator 30 is operable to regulate the pressure of fluid 14 throughout conduit 22. Pressure compensator 30 may comprise any suitable device operable to regulate pressure in fluid 14. For example, pressure compensator 30 may comprise a device described in U.S. Pat. No. 6,688,319, assigned to the same assignee of the present application. In other embodiments, pressure compensator 30 may comprise other suitable devices. In this particular embodiment, pressure compensator 30 further comprises a restrictor 92. In one embodiment, restrictor 92 may be operable to move up and down to regulate the flow of fluid 14 into inlet 34. By regulating the flow of fluid 14, restrictor 92 may further regulate the pressure differential in passage 38 and outlet 46, keeping it at a near constant value. In the illustrated embodiment, when restrictor 92 is lowered to a minimum height, inlet 34 is blocked off and fluid 14 is unable to flow into inlet 34, causing the pressure in inlet 34 to decrease, and decreasing the pressure differential between passage 38 and outlet 46. To the contrary, when restrictor 92 is raised to a maximum height, fluid 14 is able to flow, at a maximum rate, into inlet 34, causing the pressure in inlet 34 to increase, and increasing the pressure differential between passage 38 and outlet 46.

In the illustrated embodiment, pressure compensator 30 communicates with fluid 14 using feedback 42. Feedback 42 may allow fluid 14 in outlet 46 to communicate with pressure compensator 30, allowing for the regulation of pressure throughout conduit 22. Feedback 42 allows fluid 14 to flow into pressure compensator 30, allowing pressure compensator 30 to regulate the pressure differential between the pressures in outlet 46, and passage 38.

Flow regulating system 18 is operable to regulate the flow of fluid 14 from inlet 34 to outlet 46. By regulating the flow of fluid 14 from inlet 34 to outlet 46, system 10 is operable to regulate the heat transfer on fluid 14 by heat transfer system 26. In one embodiment, flow regulating system 18 may comprise an actuator 80, a pressure generator 54, an obstruction 72, and fluid 14.

Actuator 80 is operable, in cooperation with pressure generator 54, to move obstruction 72. Actuator 80 comprises a rod 76 and a chamber with heat sensitive substance 84. Rod 76 is operable to move up and down the chamber, applying pressure to heat sensitive substance 84. Rod 76 is further operable to move obstruction 72. When the amount of pressure applied to rod 76 by obstruction 72 increases, rod 76 increases the amount of pressure it applies to heat sensitive substance 84. When the amount of pressure applied to rod 76 by obstruction 72 decreases, rod 76 decreases the amount of pressure it applies to heat sensitive substance 84. Furthermore, when the volume of heat sensitive substance 84 increases, rod 76 moves up the chamber, thereby moving obstruction 72 to an open position. When the volume of heat sensitive substance 84 decreases, rod 76 moves down the chamber, allowing pressure generator 54 to move obstruction 72 to a closed position.

Heat sensitive substance 84 may comprise any suitable substance operable to change volume when subjected to a change in temperature. For example, heat sensitive substance 84 may comprise water, oil, wax, or other suitable substances, including combinations thereof. In one embodiment, heat sensitive substance 84 may comprise an alkane hydrocarbon. In the illustrated embodiment, heat sensitive substance 84 comprises a paraffin. In a further embodiment, heat sensitive substance 84 is operable to melt at a temperature ranging between 55 degrees Fahrenheit and 60 degrees Fahrenheit at 1 atmosphere of pressure. In other embodiments, heat sensitive substance 84 may melt at temperatures less than 55 degrees or greater than 60 degrees at 1 atmosphere. Further, the pressure in the chamber may be reduced to pressures other than 1 atmosphere, for example, sub-ambient pressures.

Heat sensitive substance 84 is further operable to change properties when subjected to pressure. In one embodiment, when rod 76 decreases the amount of pressure applied to heat sensitive substance 84, the melting point of heat sensitive substance 84 decreases, enabling heat sensitive substance 84 to melt at a lower temperature. To the contrary, when rod 76 increases the amount of pressure applied to heat sensitive substance 84, the melting point of heat sensitive substance 84 increases. An increased melting point causes heat sensitive substance 84 to melt at a higher temperature. If the temperature of fluid 14 is higher than the melting point of heat substance 84, then heat sensitive substance 84 will melt. When heat sensitive substance 84 melts, the volume—a characteristic of the heat sensitive substance 84—increases, causing rod 76 to move up in the chamber, pushing obstruction 72 to a more open position. If the temperature of fluid 14 is less than the melting point of heat sensitive substance 84, then heat sensitive substance 84 will solidify, causing the volume of heat sensitive substance 84 to decrease. As a result, rod 76 moves down the chamber, allowing obstruction 72 to move to a more closed position. Heat sensitive substance 84 will thus melt or solidify as needed, moving obstruction 72 to a suitable position to ensure that fluid 14 is at a temperature near to the new melting point of heat sensitive substance 84.

Pressure generator 54 is operable to provide a force against obstruction 72, urging it in the direction opposite the action of actuator 80. Pressure generator 54 may be any suitable assembly operable to apply a force against obstruction 72. In one embodiment, the force provided by pressure generator 54 is present and nearly constant as obstruction 72 moves within its entire range. The force, in some embodiments, may be adjustable. In the illustrated embodiment, pressure generator 54 comprises a screw 60, a pressure compartment 64, and a pressure device 68.

Screw 60 is operable to move up and down pressure compartment 64. Screw 60 is further operable to be adjusted to a specific height and locked into place at that height. In one embodiment, once locked into place, screw 60 may not change height unless readjusted. In the illustrated embodiment, the height of screw 60 is operable to correspond to a temperature setting for fluid 14. By adjusting the height of screw 60, screw 60 is further operable to cause pressure device 68 to compress and expand. Adjusting the height of screw 60 may comprise any suitable method. For example, adjusting the height of screw 60 may comprise a mechanical method, an electrical method, or a manual method. In the illustrated embodiment, adjusting the height of screw 60 comprises a mechanical method.

Pressure device 68 may comprise any suitable device or element operable to apply an adjustable force. For example pressure device 68 may comprise a spring, elastomeric material (e.g. rubber), pressurized air, or any other suitable device or element, including combinations thereof. In the preferred embodiment, the force applied by pressure device 68 does not change greatly over the range of travel of obstruction 72. In the illustrated embodiment, pressure device 68 comprises a spring. Pressure device 68 is further operable to apply pressure to obstruction 72. In the illustrated embodiment, screw 60 decreases height in pressure compartment 64, increasing the amount of pressure applied to pressure device 68, and causing pressure device 68 to compress. As pressure device 68 compresses, pressure device 68 increases the amount of pressure applied to obstruction 72.

Obstruction 72 is operable to apply pressure to rod 76. Obstruction 72 is further operable to regulate the flow of fluid 14 between inlet 34 and outlet 46. Obstruction 72 may comprise any suitable shape, size, and material. In the illustrated embodiment, obstruction 72 comprises a metal block. In the illustrated embodiment, as the amount of pressure applied to obstruction 72 by pressure device 68 increases, obstruction 72 increases the amount of pressure it applies to actuator 80. The increased pressure to actuator 80 increases the melting point of heat sensitive substance 84. To the contrary, as the amount of pressure applied to obstruction 72 by pressure device 68 decreases, obstruction 72 decreases the amount of pressure it applies to actuator 80. With a decreased amount of pressure applied to actuator 80, the melting point of heat sensitive substance 84 decreases. As discussed above, the melting point of heat sensitive substance 84 determines the regulated temperature of fluid 14.

In additional embodiments, flow regulating system 18 may not comprise actuator 80 or pressure generator 54. Instead, flow regulating system 18 may comprise any suitable device operable to move obstruction 72 in response to changes in temperature. For example, flow regulating system 18 may comprise an air operated cylinder operable to expand as air is pumped into the cylinder, compress as air is released from the cylinder, and further operable to apply pressure to obstruction 72. In one embodiment, the suitable device operable to apply pressure to obstruction 72 may further comprise a temperature gauge operable to measure the temperature of fluid 14 and further operable to regulate the pressure applied to obstruction 72.

In a further embodiment, flow regulating system 18 may further comprise a position indicator. The position indicator is operable to determine the position of obstruction 72 and further operable to transmit the position of obstruction 72 to a receiver. In one embodiment, the data, comprising the position of obstruction 72, sent to the receiver may be compiled with the data from a plurality of embodiments of system 10 in order to determine and control the overall demand for heating or cooling. In other embodiments, the data sent to the receiver may be used for any other suitable task or to accomplish any suitable result.

Fluid 14 is operable to conduct heat transfer on heat sensitive substance 84. In the illustrated embodiment, as fluid 14 flows into inlet 34, fluid 14 further flows over actuator 80. The difference in temperature between fluid 14 and heat sensitive substance 84 causes heat to be transferred to or from heat sensitive substance 84. In one embodiment, when heat sensitive substance 84 has a lower temperature than fluid 14, fluid 14 increases the temperature of heat sensitive substance 84, causing the volume of heat sensitive substance 84 to increase. In a further embodiment, when the temperature of heat sensitive substance 84 is higher than that of fluid 14, fluid 14 lowers, through heat transfer, the temperature of heat sensitive substance 84, causing the volume of heat sensitive substance 84 to decrease.

Flow regulating system 18 may further comprise maximum flow regulator 96. Maximum flow regulator 96 is operable to limit the maximum amount of fluid 14 that may flow from inlet 34 to outlet 46. For purpose of illustration, maximum flow regulator 96 will be described as a rotary gate. A user, comprising a person, a device, a program, an automation, or any combinations thereof, may designate the maximum amount of fluid allowed to flow past the rotary gate. In this particular embodiment, when the rotary gate is completely open, there is no restriction on the amount of fluid 14 that may pass from inlet 34 to outlet 46. To the contrary, when the rotary gate is fully closed, no amount of fluid 14 may pass from inlet 34 to outlet 46. Likewise, when the rotary gate is set to half open, only half of the maximum rate of the flow of fluid 14 may pass from inlet 34 to outlet 46. In the illustrated embodiment, the flow gate may work in conjunction with obstruction 72 to restrict the flow of fluid 14 from inlet 34 to outlet 46.

In the illustrated embodiment, flow regulating system 18 is operable to regulate the flow of fluid 14 from inlet 34 to outlet 46 by allowing for the increase or decrease in height of obstruction 72. Flow regulating system 18 is further operable to regulate the heat transfer on fluid 14 by regulating the flow of fluid 14 from inlet 34 to outlet 46. In one embodiment, decreasing the flow of fluid 14 from inlet 34 to outlet 46 causes fluid 14 to spend more time in heat transfer with heat transfer system 26, increasing the temperature of fluid 14.

When the temperature of fluid 14 increases beyond the temperature setting for fluid 14, heat sensitive substance 84 melts, causing an increase in volume of heat sensitive substance. As a result of the increased volume, rod 76 causes obstruction 72 to rise up out of passage 38, increasing the flow of fluid 14 from inlet 34 to outlet 46. The increased flow of fluid 14 causes fluid 14 to spend less time in heat transfer with heat transfer system 26, decreasing the temperature of fluid 14.

In one embodiment, system 10 may be used to regulate the temperature of fluid 14 to a temperature setting using screw 60. For example, when a user, comprising a person, a device, a program, an automation, or any combinations thereof, selects a temperature for fluid 14 above the present temperature of fluid 14, screw 60 decreases height. The decrease in height causes an increase in the amount of pressure applied to pressure device 68, increasing the pressure applied to obstruction 72 and thermal actuator 80. Applying an increased amount of pressure to heat sensitive substance 84 increases the melting point of heat sensitive substance 84, causing the current temperature of fluid 14 to be lower than the melting point of heat sensitive substance 84. With the temperature of fluid 14 lower than the melting point of heat sensitive substance 84, heat sensitive substance 84 begins to solidify and decrease volume. The decreased volume lowers the amount of pressure rod 76 applies to obstruction 72, causing obstruction 72 to lower into passage 38, restricting the flow of fluid 14. With the flow restricted, fluid 14 increases temperature as a result of spending more time in heat transfer with heat transfer system 26. The restriction of fluid 14 continues until the temperature of fluid 14 is above the temperature setting selected for fluid 14, at which point heat sensitive substance 84 begins to melt and the amount of fluid 14 passing from inlet 34 to outlet 46 increases.

Modifications, additions, or omissions may be made to system 10, flow regulating system 18, heat transfer system 26, pressure compensator 30, pressure generator 54, and/or any system included in any embodiment of system 10 without departing from the scope of the invention. The components of each system may be integrated or separated according to particular needs. Moreover, the operations of each system may be performed by more, fewer, or other components. For example, the operations of maximum flow regulator 96 may be performed by more than one component. As used in this document, "each" may refer to each member of a set or each member of a subset of the set.

FIGS. 2A through 2D are cutout views of flow regulating system 18 according to an embodiment of the invention. In this particular embodiment, flow regulating system 18 further comprises maximum flow regulator 96. Additionally, each of the illustrated views correspond to different settings made by a user, wherein a user comprises a person, a device, a program, an automation, or any combinations thereof.

Figure 2A:
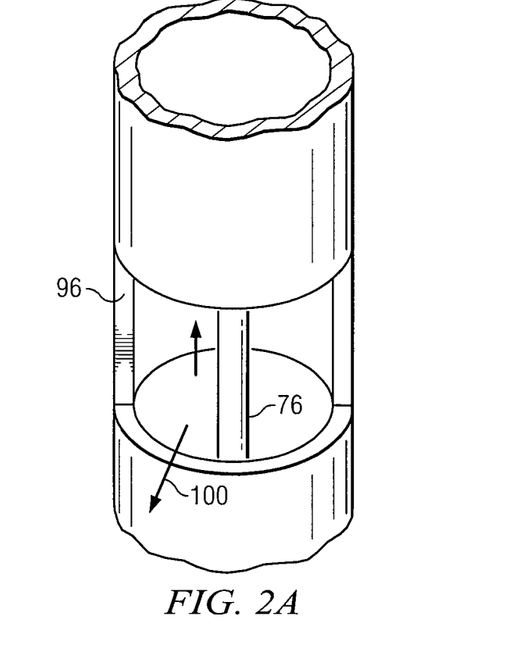
FIGS. 2A, 2B, 2C, and 2D are cutout views of a flow regulating system of a system operable to regulate heat transfer on a fluid.

In FIG. 2A, maximum flow regulator 96 is preset to allow for the maximum amount of flow between inlet 34 and outlet 46 and the selected temperature of fluid 14 is lower than the current temperature, causing the current temperature of fluid 14 to be higher than the melting point of heat sensitive substance 84. As a result, heat sensitive substance 84 is melting and increasing volume. The increased volume of heat sensitive substance 84 causes obstruction 72 to be at its maximum height, causing it to not be seen in this figure. This allows fluid 14 to flow, as seen by arrow 100, at a maximum rate between inlet 34 and outlet 46.

Figure 2B:
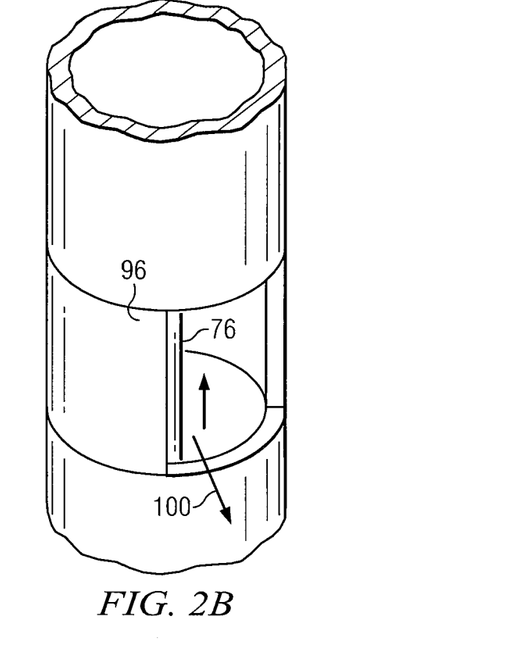

At FIG. 2B, the maximum flow regulator is preset for a fifty percent maximum flow rate and the selected temperature for fluid 14 is lower than the current temperature. Because maximum flow regulator 96 is half closed, fifty percent of the flow of fluid 14 is obstructed, thus, the maximum flow rate of fluid 14 from inlet 34 to outlet 46 is fifty percent of the maximum capability of system 10. Like FIG. 2A, because the selected temperature of fluid 14 is lower than the current temperature, the current temperature of fluid 14 is higher than the melting point of heat sensitive substance 84, causing actuator 80 to move obstruction 72 to its maximum height, thus obstruction 72 is not shown in this figure. This allows fluid 14 to flow at a maximum rate, which is only fifty percent because of the impediment caused by maximum flow regulator 96.

Figure 2C:
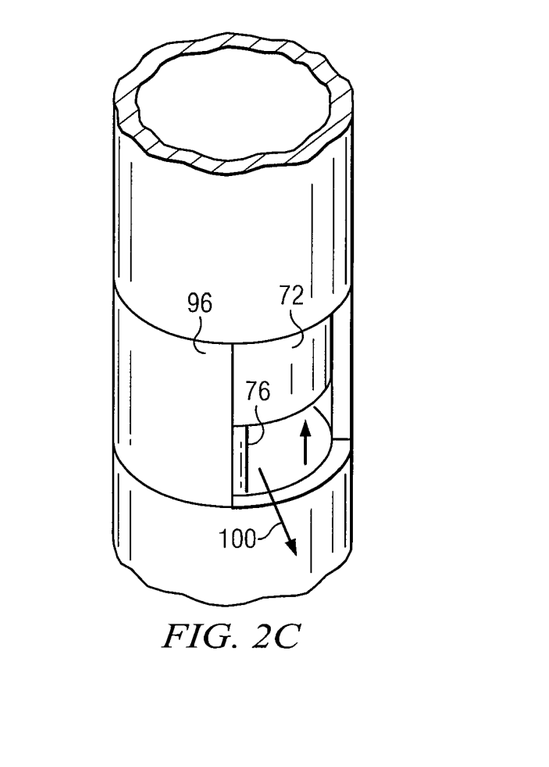

FIG. 2C shows flow regulating system 18 with a maximum flow rate of fluid 14 preset at fifty percent and a selected temperature higher than the current temperature of fluid 14. As a result, heat sensitive substance 84 is partially solidified, allowing obstruction 72 to move approximately halfway through its range of travel. As is the case in FIG. 2B, maximum flow regulator 96 is half closed, causing the maximum flow rate of fluid 14 to be fifty percent. However, because solidification of heat sensitive substance 84 is causing actuator 80 to allow obstruction 72 to decrease height, obstruction 72 is restricting the flow of fluid 14 to fifty percent of its normal flow. Therefore, because obstruction 72 is restricting the flow by fifty percent and maximum flow regulator 96 is also restricting the flow by fifty percent, the flow of fluid 14 is restricted to twenty-five percent of its maximum flow rate in system 10.

Figure 2D:
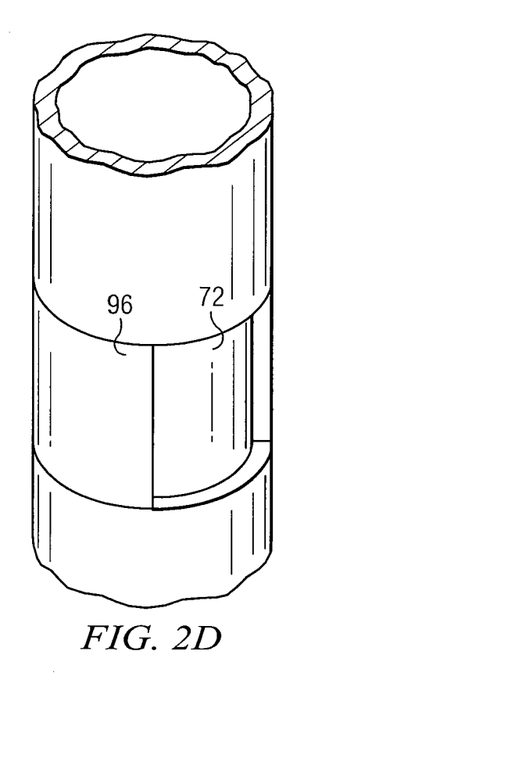

FIG. 2D shows flow regulating system 18 with a maximum flow rate of fluid 14 preset at fifty percent and a selected temperature much higher than the current temperature of fluid 14. This might occur, in one embodiment, if there is no air flow over heat exchange system 26. In the illustrated embodiment, fluid 14 is colder than the melting point of heat sensitive substance 84, and has been for some time, causing actuator 80 to allow obstruction 72 to completely decrease height and entirely restrict the flow of fluid 14 from inlet 34 to outlet 46. Therefore, no amount of fluid 14 is flowing into outlet 46, causing fluid 14 to spend more time in heat exchange with heat exchange system 26 (not shown). As a result, the temperature of fluid 14 is increasing. This temperature increase will continue until the temperature of fluid 14 is above the selected temperature, at which point, not shown in this figure, actuator 80 will cause obstruction 72 to allow an increased flow of fluid 14.

Figure 3:
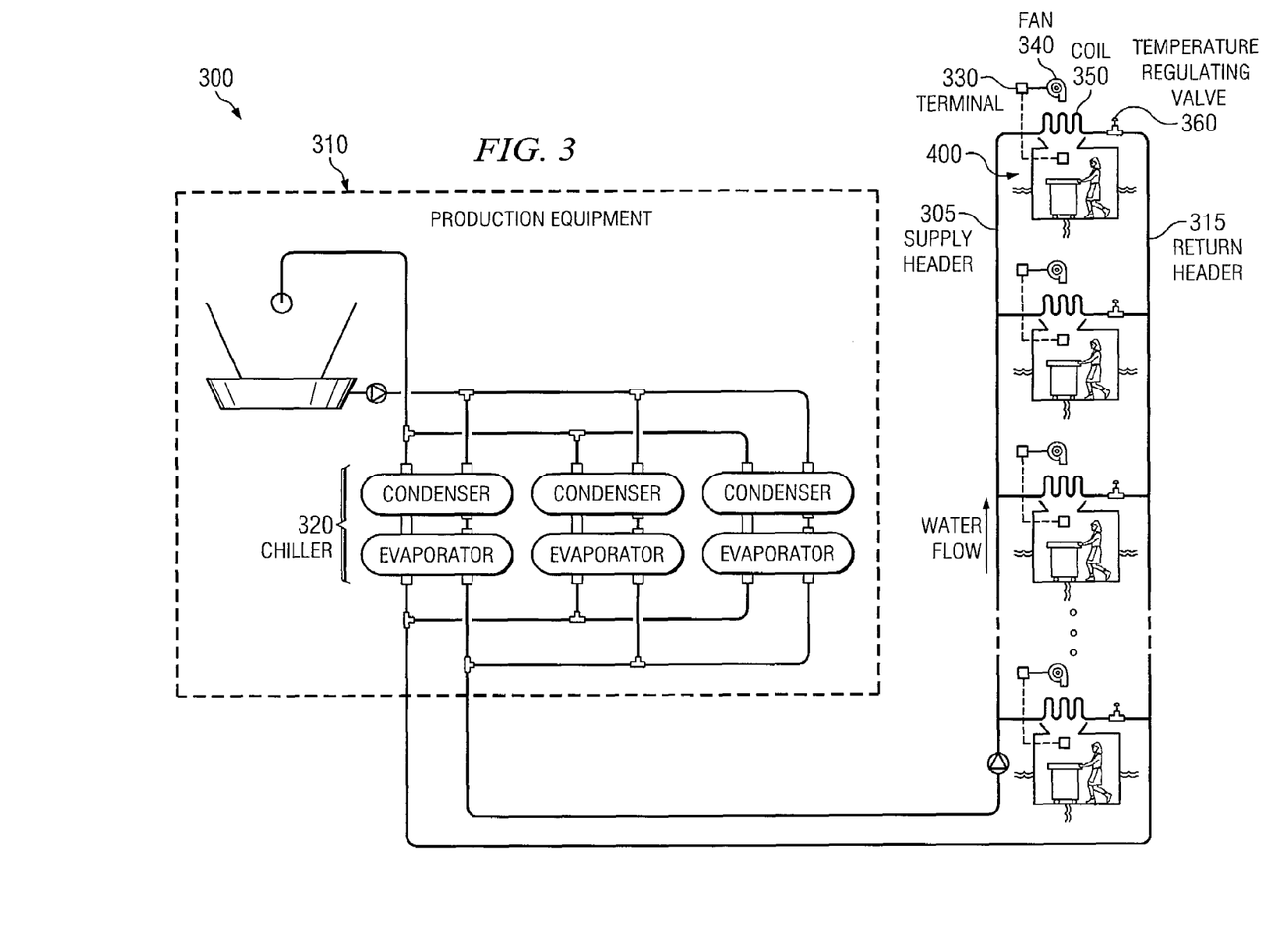
FIG. 3 shows an illustration of a thermal transfer system, according to an embodiment of the invention.

FIG. 3 shows an illustration of a thermal transfer system 300, according to an embodiment of the invention. The thermal transfer system 300 of may be utilized to regulate the temperature in one or more units 400 within a building or other structure. The thermal transfer system 300 of FIG. 3 includes production equipment 310 (which may include chillers 320), a supply header line 305, and a return header line 315. For each unit 400, the thermal transfer system 300 includes a terminal 330, a fan 340, a coil 350, and a temperature regulating valve 360. Each unit 400 may additionally include a variety of other devices, including but not limited to a thermostat and the like.

The temperature regulating valve 350 for a corresponding terminal 330 is shown disposed between the terminal 330 and the return header line 315. In other words, the terminal is disposed on the return fluid line for a particular unit 400. In particular embodiments, the temperature regulating valve 350 may be the system 10 shown in FIG. 1 above. In other embodiments, the temperature regulating valve may be other types of valves or systems.

Modifications, additions, or omissions may be made to the thermal transfer system 300. For example, the components of thermal transfer system 300 may be integrated or separated according to particular needs. Moreover, the operations of the thermal transfer system 300 may be performed by more, fewer, or other components.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A system for regulating a temperature of a fluid through a conduit, the system comprising:
   a conduit having an inlet, an outlet, and an opening between the inlet and the outlet, the inlet operable to receive fluid into the conduit and the outlet operable to dispense of fluid out of the conduit;
   a moveable obstruction operable to at least partially cover the opening and thereby resist flow of fluid through the opening;
   an actuator having a chamber with a heat sensitive substance, the heat sensitive substance operable to change a characteristic upon receipt of thermal energy from fluid traveling through the conduit, and the actuator operable to move the obstruction upon the change in characteristic of the heat sensitive substance;
   a pressure generator operable to apply pressure to the chamber to change a property of the heat sensitive substance, the change in property of the heat sensitive substance changing the movement of the obstruction by the actuator; and
   wherein the heat sensitive substance is a phase changing material and the change of the characteristic is a melting of the phase changing material.

2. The system of claim 1, wherein change in property of the heat sensitive substance is a change in a melting point of the heat sensitive substance.

3. The system of claim 1, wherein the heat sensitive substance upon changing characteristic moves the obstruction over the opening to reduce flow of fluid through the opening.

4. The system of claim 1, wherein the heat sensitive substance upon changing characteristic moves the obstruction away from the opening to increase flow of fluid through the opening.

5. The system of claim 1, further comprising:
   a pressure compensator operable to keep a pressure differential across the opening at a nearly constant value.

6. The system of claim 1, further comprising:
   a maximum flow regulator operable to control a maximum amount of flow through the opening.

7. The system of claim 6, wherein the maximum flow regulator has an flow regulator inlet and a flow regulator outlet, the flow regulator outlet orthogonal to the flow regulator inlet.

8. The system of claim 1, wherein the pressure generator is operable to apply an adjustable amount of pressure to the chamber, the amount of pressure applied to the chamber corresponding to a desired temperature of the fluid in the conduit.

9. The system of claim 1, wherein
   the actuator includes a rod operable to move in and out of the chamber, the rod coupled to the obstruction, and the change in characteristic of the heat sensitive substance forces movement of the rod to move the obstruction; and
   the pressure generator includes a screw and a spring, the spring acting against a movement of the rod out of the chamber, and the screw adjusting a compression of the spring.

10. The system of claim 1, wherein the heat sensitive substance is an alkane hydrocarbon.

11. The system of claim 1, wherein the heat sensitive substance is a paraffin.

12. The system of claim 1, wherein the heat sensitive substance has a melting point between 55 degrees Fahrenheit and 60 degrees Fahrenheit.

13. The system of claim 1, further comprising:
   a position indicator coupled to the obstruction, the position indicator operable to transmit the position of the obstruction to a receiver.

14. The system of claim 13, wherein
   the receiver is part of a building management system,
   the building management system receive positions of multiple obstructions in multiple systems, and
   the building management system is further operable to adjust the production of heated or cooled water based on the positions of the obstructions.

15. The system of claim 1, wherein the system is positioned on a return fluid line for a terminal of a hydronic system.

16. The system of claim 1, further comprising:
   a pressure compensator operable to keep a pressure differential across the opening at a nearly constant value; and
   a maximum flow regulator operable to control the maximum amount of flow through the opening, wherein
      the change in characteristic is a change of volume of the fluid,
      the change in property of the heat sensitive substance is a change in a melting point of the heat sensitive substance,
      the actuator includes a rod operable to move in and out of the chamber, the rod coupled to the obstruction, and the change in characteristic of the heat sensitive substance forces movement of the rod to move the obstruction; and
      the pressure generator includes a screw and a spring, the spring acting against a movement of the rod out of the chamber, and the screw adjusting a compression of the spring, and
      the heat sensitive substance is an alkane hydrocarbon.

17. A system for regulating a temperature of a fluid through a conduit; the system comprising:
   a conduit having an inlet, an outlet, and an opening between the inlet and the outlet, the inlet operable to receive fluid into the conduit and the outlet operable to dispense of fluid out of the conduit;
   a moveable obstruction operable to at least partially cover the opening and thereby resist flow of fluid through the opening;
   a temperature regulating mechanism, the temperature regulating mechanism comprising an actuator having a chamber with a heat sensitive substance, the heat sensitive substance operable to change a characteristic upon receipt of thermal energy from fluid traveling through the conduit, and the actuator operable to move the obstruction upon the change in characteristic of the heat sensitive substance;
   a maximum flow regulator operable to control the maximum amount of flow through the opening, the maximum flow regulator operating independently of the temperature regulating mechanism;
   a pressure generator operable to apply pressure to the chamber to change a property of the heat sensitive substance, the change in property of the heat sensitive substance changing the movement of the obstruction by the actuator; and wherein the heat sensitive substance is a phase changing material and the change of the characteristic is a melting of the phase changing material.

18. The system of claim 17, wherein the actuator of the temperature regulating mechanism has a range of motion, and the maximum flow regular allows the actuator of the temperature regulating mechanism to maintains its range of motion when a maximum flow rate of the maximum flow regulator is reduced.

19. The system of claim 17, wherein the maximum flow regulator has an flow regulator inlet and a flow regulator outlet, the flow regulator outlet orthogonal to the flow regulator inlet.

20. The system of claim 17, wherein the heat sensitive substance upon changing characteristic moves the obstruction away from the opening to increase flow of fluid through the opening.

21. The system of claim 17, further comprising:

a pressure compensator operable to keep a pressure differential across the opening at a nearly constant value.

22. The system of claim 17, wherein the heat sensitive substance is an alkane hydrocarbon.

23. The system of claim 17, wherein the heat sensitive substance is a paraffin.

24. The system of claim 17, wherein the heat sensitive substance has a melting point between 55 degrees Fahrenheit and 60 degrees Fahrenheit.

25. A system for regulating a temperature of a fluid through a conduit, the system comprising:

a conduit having an inlet, an outlet, and an opening between the inlet and the outlet, the inlet operable to receive fluid into the conduit and the outlet operable to dispense of fluid out of the conduit;

a moveable obstruction operable to at least partially cover the opening and thereby resist flow of fluid through the opening;

an actuator having a chamber with a phase changing material, the phase changing material operable to change from a solid to a liquid or a liquid to a solid based upon receipt of thermal energy from fluid traveling through the conduit, and the actuator operable to move the obstruction based upon the phase of the phase changing material; and a pressure generator operable to apply pressure to the chamber to change a melting point of the phase changing material.

26. The system of claim 25, further comprising:

a maximum flow regulator has an flow regulator inlet and a flow regulator outlet, the flow regulator outlet orthogonal to the flow regulator inlet.

27. The system of claim 26, wherein the actuator of the temperature regulating mechanism has a range of motion, and the maximum flow regular allows the actuator of the temperature regulating mechanism to maintains its range of motion when a maximum flow rate of the maximum flow regulator is reduced.

* * * * *

UNITED STATES PATENT AND TRADEMARK OFFICE
CERTIFICATE OF CORRECTION

PATENT NO.       : 7,621,461 B2
APPLICATION NO.  : 11/465650
DATED            : November 24, 2009
INVENTOR(S)      : Trantham et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 303 days.

Signed and Sealed this

Fourteenth Day of December, 2010

David J. Kappos
*Director of the United States Patent and Trademark Office*